Nov. 13, 1934.　　　　　E. ENGEL　　　　　1,980,616

CYLINDER FOR HYDRAULIC BRAKES

Filed July 2, 1931

INVENTOR
Ernst Engel
BY
Francis D Hardesty
ATTORNEY

Patented Nov. 13, 1934

1,980,616

UNITED STATES PATENT OFFICE 1,980,616

CYLINDER FOR HYDRAULIC BRAKES

Ernst Engel, Frankfort-on-the-Main, Germany, assignor to Alfred Teves, Frankfort-on-the-Main, Germany Application July 2, 1931, Serial No. 548,446
In Germany May 19, 1930

2 Claims. (Cl. 188—152)

This invention relates to hydraulic brake constructions.

An object of the invention is a construction employing duplicate fluid pressure lines for each brake and brake cylinder, one or the other only of which lines is normally in use, but either of which alone is capable of operating the brake, without attention or manipulation on the part of the operator, in the event of failure of any line.

Still further objects will readily occur to those skilled in the art upon reference to the following description and the accompanying drawing in which Figure 1 shows a modification for use with an internal expanding brake.

Figure 1:
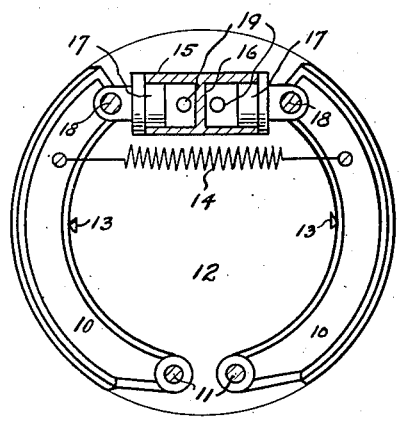

Referring to Figure 1 it will be seen that the brake mechanism includes a pair of braking members 10 pivotally mounted at 11 on the anchor plate 12 to expand and engage the drum (not shown) to restrain rotation of the latter. Stops 13 limit the inward movement of the members 10, such movement being imparted to them by the coiled tension retracting spring 14, connecting them and opposing their expanding tendency. Floatingly disposed between the free ends of the members 10 is a cylinder 15 divided into two open-end compartments by a transverse wall 16. The open ends of the cylinders are closed by pistons 17 pivotally connected to the free ends of the braking members at 18, and leading into each compartment is a fluid pipe line 19.

Normally one or the other of the lines is in use, and fluid pressure imparted thereby will serve to separate one of the pistons and the cylinder, consequently expanding the brake. If the line normally in use were to fail for any reason, the other line would serve to separate the other piston and the cylinder, thereby operating the brake.

Figure 2:
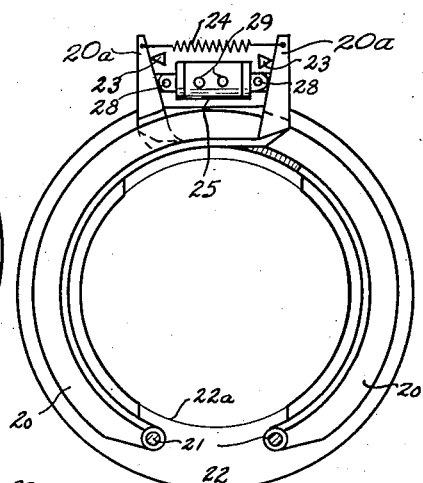
Figure 2 shows a modification for use with an external contracting brake.

The external contracting brake of Figure 2 includes braking members 20 pivotally mounted at 21 on an anchor plate 22 to engage a drum 22a. Stops 23 and a coiled tension retracting spring 24 are provided between the outwardly extended arms 20a of the overlapped brake shoes 20. Floating between these ends 20a is a similar double open ended cylinder assembly 25 having a transverse dividing wall and pistons (like parts 16 and 17 of Figure 1) articulated to the braking members at 28. Separate fluid pressure lines 29 lead into the cylinders on opposite sides of the dividing wall.

Figure 3:
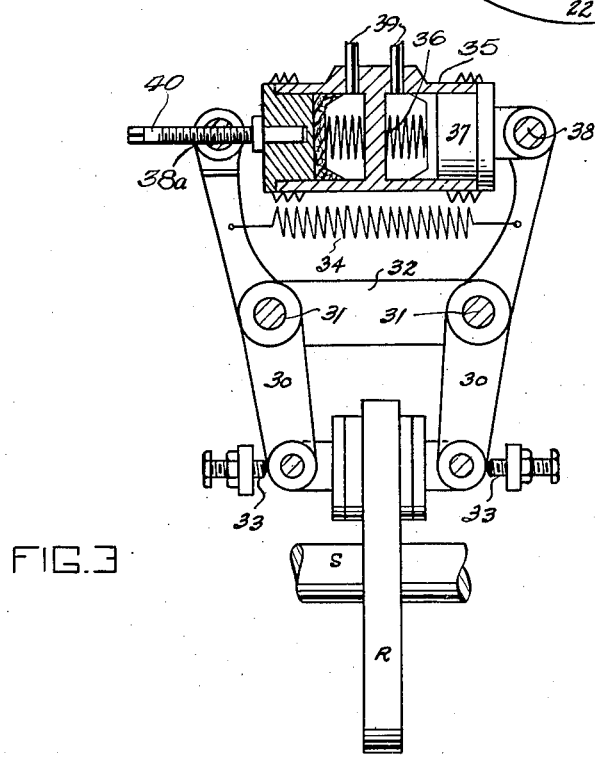
Figure 3 shows a third modification.

The brake mechanism of Figure 3 includes braking members 30 pivotally mounted at 31 on a support 32 to engage and restrain rotation of the rotating element R, journalled on shaft S. The usual stops 33 and spring 34 for governing retractile movement are provided. Between the free ends of the members 30 floats the open ended cylinder 35, provided with a transverse wall 36 and pistons 37, one of which is articulated as at 38 to one of the members 30, while the other, to provide adjustment, may be connected to the opposite pivot pin 38a by a thrust element 40 which is rotatable in the piston and threaded into the pivot pin. Fluid pressure lines 39 lead into the cylinders on opposite sides of the wall 36.

What I claim is:

1. In a braking mechanism, in combination with a movable element desired to be braked, a pair of braking members adapted to be moved to engage said movable element to be braked and thereby to restrain movement of the latter, a cylinder, freely mounted and disposed between the braking members, and having open ends and a transverse diaphragm, pistons in and closing the open ends of the cylinder, each being connected to a braking member, and separate fluid pressure conduits leading into the cylinder, one on each side of the diaphragm, between the latter and the piston.

2. In a braking mechanism, in combination with a movable element desired to be braked, a pair of braking members adapted to be moved to engage said movable element to be braked and thereby to restrain movement of the latter, a cylinder freely mounted and disposed between the braking members, and having open ends and a transverse diaphragm, pistons in and closing the open ends of the cylinder, each being connected to a braking member, and separate fluid pressure conduits leading into the cylinder, one on each side of the diaphragm, between the latter and the piston, and resilient means connecting the braking members and tending to move the pistons further into the cylinder, towards the diaphragm, and thereby to resist the pressure of fluids admitted into the cylinder.

ERNST ENGEL.